(12) United States Patent
Strater

(10) Patent No.: US 6,557,796 B1
(45) Date of Patent: May 6, 2003

(54) DESOLDERING WICK DISPENSER

(75) Inventor: William H. Strater, Fontana, CA (US)

(73) Assignee: Plato Products, Inc., Industry, CA (US)

( * ) Notice: Subject to any disclaimer, the term of this patent is extended or adjusted under 35 U.S.C. 154(b) by 0 days.

(21) Appl. No.: 09/419,530

(22) Filed: Oct. 18, 1999

Related U.S. Application Data
(60) Provisional application No. 60/155,714, filed on Sep. 23, 1999.

(51) Int. Cl.[7] .............................................. B65D 85/02
(52) U.S. Cl. ................ 242/588.3; 242/128; 242/615.3; 206/409; 228/19
(58) Field of Search ............................. 242/588, 588.2, 242/588.3, 128, 615.1, 615.3; 206/409; 228/19

(56) References Cited

U.S. PATENT DOCUMENTS

| | | | |
|---|---|---|---|
| 3,272,455 A | * | 9/1966 | Sternberg et al. ............ 242/128 |
| 3,430,886 A | | 3/1969 | Sweeney .................. 242/118.7 |
| 3,726,464 A | * | 4/1973 | Howell et al. ................. 228/19 |
| 4,194,705 A | | 3/1980 | Spirig |
| 4,746,050 A | | 5/1988 | Brown |
| 5,031,982 A | * | 7/1991 | Redford .................. 242/128 X |
| 5,758,834 A | * | 6/1998 | Dragoo et al. .............. 242/128 |
| 6,027,068 A | | 2/2000 | Lantsman |
| 6,273,358 B1 | | 8/2001 | Hileman |

* cited by examiner

Primary Examiner—John Q. Nguyen
(74) Attorney, Agent, or Firm—Christie, Parker & Hale, LLP

(57) ABSTRACT

A desoldering wick dispenser includes a conventional wick package in the form of a bowl with a central hub and a flat cover mounted on the hub and having a gap between the edge of the cover and the outer edge of the bowl. A desoldering wick is coiled in the bowl around the hub and an end portion passes through the gap is drawn through a tube so that an end of the wick extends beyond the end of the tube. The wick is manipulated by the tube when used. In an embodiment of combined package and tube, the package has a funnel shaped housing containing a coil of desoldering wick. An end portion of the desoldering wick extends through a tube extending from the center of the housing. The coil of desoldering wick is a spiral having a conical shape approximately complementary to the end of the housing. Alternatively, the coil may be a helically wound spool of wick in a somewhat more elongated tubular housing. The end of the wick extending through the tube is drawn from the center of the coil. The tube may be metal or plastic and may be a continuous or split tube, or formed from a helically coiled wire.

19 Claims, 4 Drawing Sheets

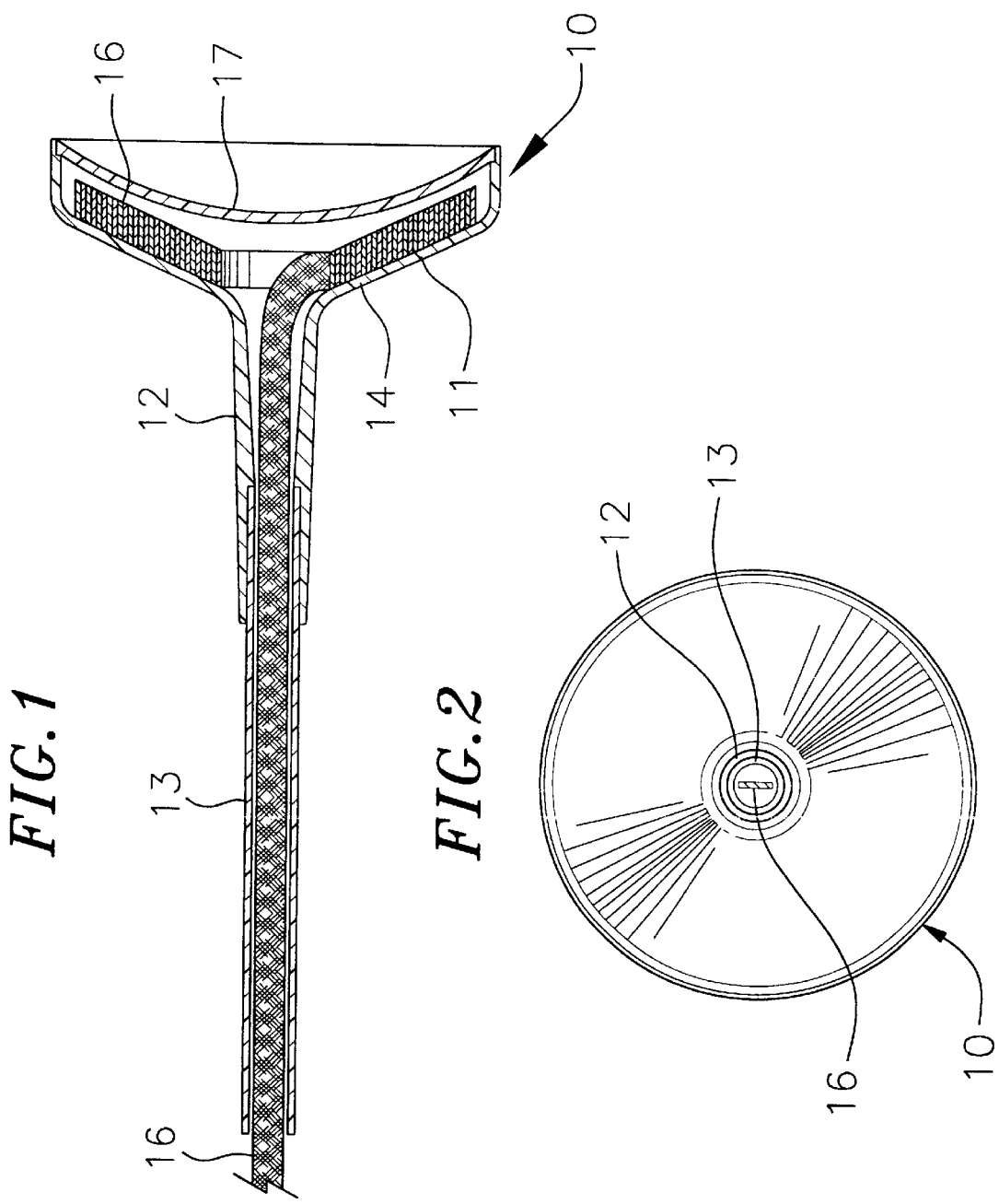

DESOLDERING WICK DISPENSER

This application claims the benefit of prov. application Ser. No. 60/155,714, filed Sep. 23, 1999.

BACKGROUND

This invention relates to a dispenser for wick used for absorbing molten solder.

It is fairly common in the electronics industry to remove solder from a printed circuit board. This may be needed, for example, when a component has been removed and is to be replaced by a different component. For many years, solder has been removed by placing a copper wick on the solder and touching it with a hot soldering iron. Such wicks are typically a braid of copper wire having open space for receiving solder. More recently, desoldering wicks have been made of what amounts to woven screen wire folded in multiple layers, leaving space within the mesh and between layers of the mesh for receiving molten solder. Typically, the desoldering wick has a thin layer of flux so that when the solder melts, it is drawn into the wick by capillary action.

Short lengths (e.g. 1.5 m.) of desoldering wick are available in disk-like plastic packages containing a flat spiral of desoldering wick. A typical package has a dish-shaped half with a hollow central hub (somewhat like an angel food cake pan) A flat "cover" is secured to the hub and fits closely near the outer edge of the container. An end of the desoldering wick is pulled through the narrow gap around the edge of the cover. The desoldering wick is unwound from the outside of the two dimensional spiral of wick that surrounds the hub. The user typically holds the dispenser with a short length of protruding wick which is touched against the solder to be removed. Such a dispenser is illustrated in U.S. Pat. No. 3,430,886.

It is desirable to provide a dispenser for desoldering wick which is easily handled and can contain larger lengths of desoldering wick. Furthermore, it is desirable for the dispenser to have an elongated guide for the desoldering wick to permit it to reach into tight spaces for removing solder.

BRIEF SUMMARY OF THE INVENTION

There is, therefore, provided in practice of this invention according to a presently preferred embodiment, a desoldering wick dispenser having a housing with a coil of desoldering wick in the housing. An end portion of the wick extends through a tube for manipulating the wick during use. In one embodiment a conventional package contains the coil of desoldering wick. In another embodiment, there is a central aperture in the end of the housing and the tube containing an end portion of the wick extends away from the aperture.

Preferably, the housing is funnel shaped with the tube extending from the center of the funnel. The coil of wick is in the form of a conical spiral and the end of the wick extending through the tube is drawn from adjacent the center of the coil. If desired, the tube may be formed of a helical coil of wire.

DRAWINGS

These and other features and advantages of this invention will be appreciated as the same becomes better understood by reference to the following detailed description when considered in connection with the accompanying drawings, wherein FIG. 1 illustrates a desoldering wick dispenser in longitudinal cross-section;

FIG. 2 is an end view of the dispenser of FIG. 1;

DESCRIPTION

Figure 3:
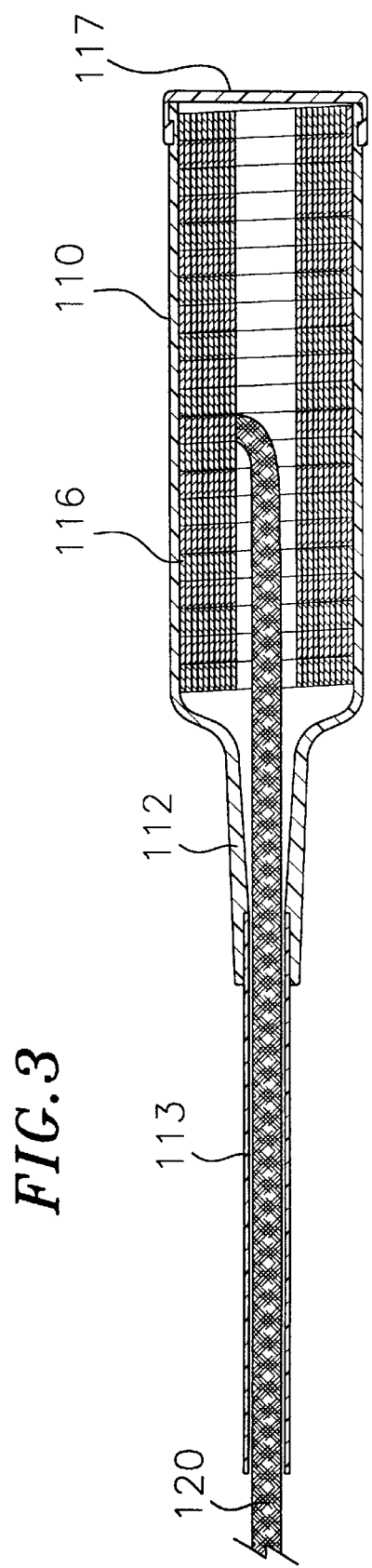
FIG. 3 illustrates in longitudinal cross section a second embodiment of desoldering wick dispenser.

In a first embodiment the desoldering wick dispenser is in the form of a funnel-shaped housing 10, having an enlarged hollow body 11 and a protruding axial nose 12. A tube 13 is inserted into the end of the nose portion of the housing and extends a few centimeters so that the total length of the nose and tube portions is in the order of ten cm. This turns out to be a convenient length for handling the dispenser. The tube may be longer on a commercial product, giving the user an opportunity to shorten the dispenser by snipping off a portion of the tube.

The housing has a generally conical end face 14 around a central aperture through the nose portion. There is a smoothly rounded surface between the tapering end face and the inside wall of the aperture.

The tube inserted into a socket in the end of the nose may be heat resistant plastic held in place solely by friction or it may be adhesively bonded to the injection molded housing. Alternatively, the tube may be a metal, such as aluminum or stainless steel, which is not wettable by molten solder. A metal tube may be longitudinally slit and slightly larger in diameter than the socket in the end of the nose. Such a tube is squeezed to a slightly smaller diameter and springs out against the inside of the nose to secure the tube in place. A metal tube may also be adhesively bonded to a plastic housing. If desired, the tube may be integral with the housing, i.e., the nose of the funnel shaped housing is elongated to a desired extent.

A conical coil 16 of desoldering wick fits into the circular housing. An end of the wick drawn from adjacent the center of the spiral coil extends through and slightly beyond the end of the axial tube 13. The desoldering wick may be a conventional braid of copper wire, a knitted wick, or preferably multiple layers of folded copper screen mesh. Any of such embodiments has a thin coating of solder flux. Desoldering wick is used in sizes 1, 2, 3, 4, 5 and 6 with the numerals indicating the approximate width of the desoldering wick in millimeters. About 90 percent of the usage is in sizes 2, 3 and 4. Any of these sizes are suitable for fitting into the housing of the desoldering wick dispenser. The housing can readily be made deep enough to accommodate a wide embodiment of desoldering wick and at the same time, quite satisfactorily contain wick with a narrow width. An exemplary desoldering wick has a thickness of about 0.4 mm. A housing as described can readily accommodate and dispense ten meters of desoldering wick.

A dome shaped cover 17 snaps into the open end of the funnel shaped housing to close it and protect the desoldering wick. The convex face of the dome shaped cover conforms more or less to the conical coil of desoldering wick to keep it in place.

An operator uses the desoldering wick by gripping it around the narrow perimeter of the housing and directing the tube toward a spot where solder is to be removed. Alternatively, the housing may be "palmed" and the tube directed with the operator's fingers. Other operators may prefer to hold the dispenser with the fingers on the tube, more like one holds a pencil.

A bit of desoldering wick extends beyond the end of the tube. The amount drawn from the coil and pulled out of the end of the tube is determined by the operator, as required. For a particular task, the wick can be drawn out of the tube by fingers or preferably by conventional clippers. Such clippers are used to snip off an end of the wick after it is used and engorged with solder. Thus, in a single operation, the clippers can draw out enough wick for the next desoldering job and the already used end snipped off. By drawing the wick in this manner, it is not necessary to touch it with the fingers.

The elongated tube on the housing permits the operator to place the desoldering wick in a precise location on a circuit board or the like. The tube permits such placement in narrow spaces between components which may be crowded together on densely packed circuit boards.

Conventional coiled wick on spools or in prior dispensers is typically advanced by grasping the wick with one's fingers and pulling from the spool. This contaminates the flux and leaves deposit of flux on the fingers of the operator.

The included half angle between the conical end face and the axis of the dispenser is in the range of from 45° to 75° and is preferably about 65°. The angle of the cone of desoldering wick in the housing has approximately the same angle as the housing. It is found that such an angle (rather than a flat coil) enhances the drawing of desoldering wick from near the center of the coil without hindrance by friction or tangling.

The spiral coil of desoldering wick is easily wound as a two dimensional spiral. The coil is placed in the housing and a conical tool pressed in to deform the coil to approximately match the taper on the end of the housing. An end of the desoldering wick near the center of the coil is then pushed or pulled through the nose and tube. The dome shaped end cover can then be snapped in place.

FIG. 3 illustrates a second embodiment of desoldering wick dispenser which resembles the first embodiment, but employs a three dimensional spool of desoldering wick instead of an essentially two dimensional spiral coil of wick. In this embodiment, the circular housing 110 is elongated and has a somewhat smaller diameter than the housing illustrated in FIG. 1. A tube 113 is pressed into an extending nose portion 112 of the housing. An end cover snaps over the opposite open end of the housing.

A coil of desoldering wick 116 is contained within the housing and an end 120 of the wick extends through and out of the end of the tube. This coil of desoldering wick is wound as a spool having successive layers of right hand and left hand helixes of wick. Such an elongated coil of wick can be wound using a mechanism similar to what is used for guiding line on a fishing reel. The end portion of the wick extending through the tube is drawn from the inside of the coil similar to the way string is pulled from the center of a ball of string. A greater length of desoldering wick can be contained in such a three dimensional coil than in the essentially two dimensional coil in the housing of the first embodiment. This is particularly true for the narrower widths of desoldering wick.

With wider widths of wick, an increased weight may make the coil unduly heavy. An excess amount of desoldering wick stored in the dispenser may make the back end heavy and not as comfortable to handle by the person using the dispenser. An increased weight may, however, be offset by the convenient shape where the housing has a smaller diameter and is elongated.

Figure 4:
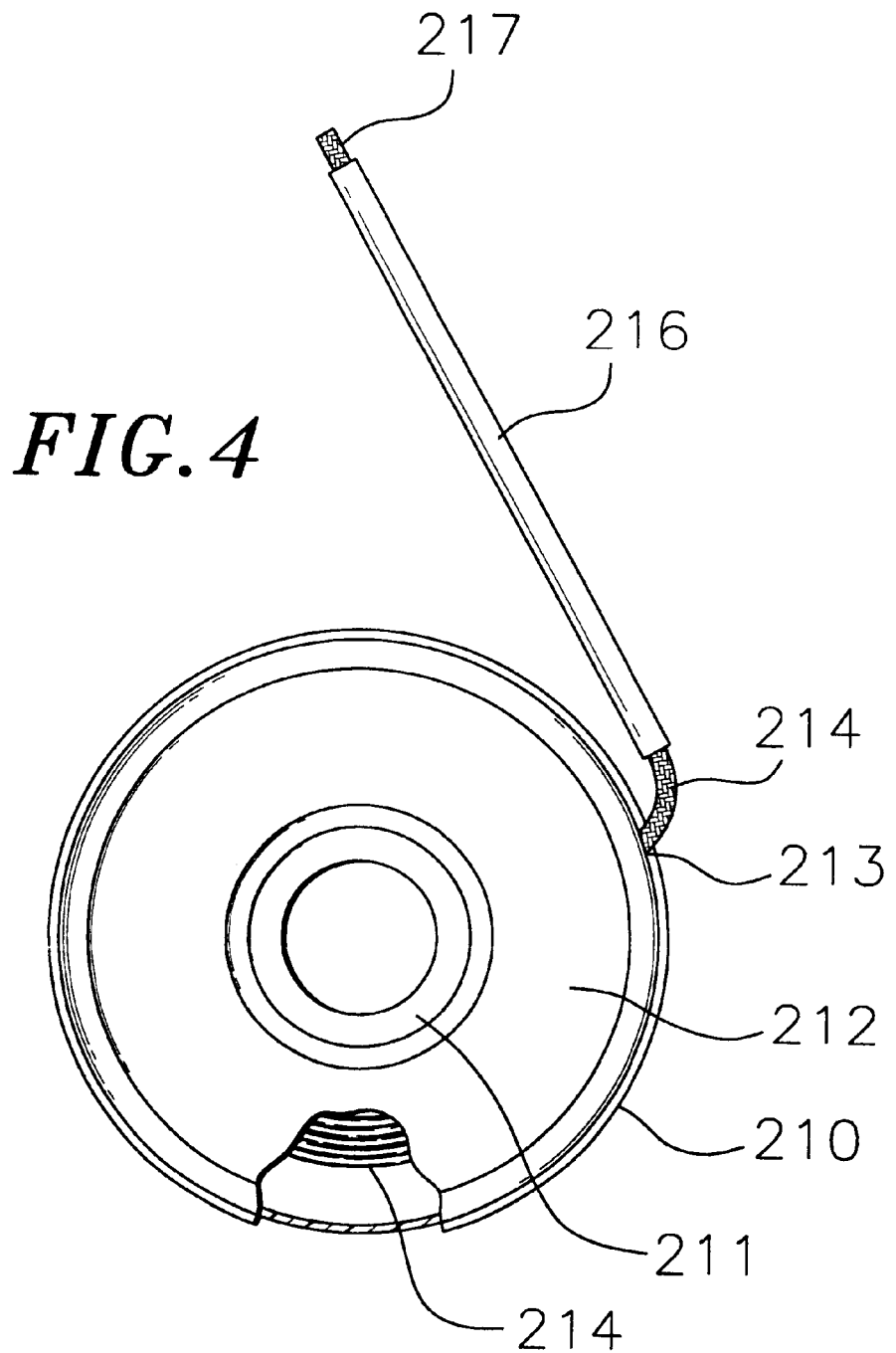
FIG. 4 illustrates in a partly cutaway view another embodiment of desoldering wick dispenser.

FIG. 4 illustrates a desoldering wick dispenser employing a conventional package for the wick. The wick containing package comprises a dish-shaped or bowl-shaped body 210 with a hollow central hub 211 (somewhat like an angel food cake pan). The bowl has a typical diameter of about 4.7 cm. and is about one cm. deep. An approximately flat cover 212 snaps onto the hub and fits closely near the outer edge of the body, leaving a narrow gap 213 around the edge of the cover. The desoldering wick 214 is wound in a two-dimensional or flat spiral around the central hub (before the cover is placed on the body). The wick is unwound from the outside of the spiral of wick that surrounds the hub. The end of the wick is drawn through the gap around the edge of the cover and is slightly pinched by the close fit between the cover and the body so that it does not freely unwind. Such a dispenser is illustrated in U.S. Pat. No. 3,430,886, which is hereby incorporated by reference.

The end of the desoldering wick unwound from the spiral is passed through a tube 216 so that the end 217 of the wick extends beyond the end of the tube. A convenient tube length is about 5 to 7 cm. The diameter of the tube is enough to provide some friction against the wick, for the particular size wick employed (from about 1 to 6 mm, most commonly 2, 3 or 4 mm). The friction is enough to prevent the wick from falling from the tube, but not so much that it is hard to draw the wick through the tube. When this embodiment is used, the wick is held by means of the tube so that the wick can be placed in a precise location on a circuit board or the like. The package with coiled wick inside is readily "palmed" or left dangling from the end of the tube as the tube is held much like one holds a pencil. The friction between the cover and body engaging the wick is enough to support the package.

After solder is sucked into the wick, a little more can be pulled out of the package, and the additional length pulled through the tube a little further with clippers and the end snipped off. By using a tube in combination with the conventional package, almost the entire length of wick may be used before discarding the final "tail". The wick is manipulated by the tube even after the inside end is pulled out of the package. The tube keeps the operator's fingers cool. By being careful not to pull out too much of the unused wick, even a short remaining bit of wick may be used. With a plastic tube, the sides can be pinched against the wick to add friction as the wick is pulled out.

Figure 5:
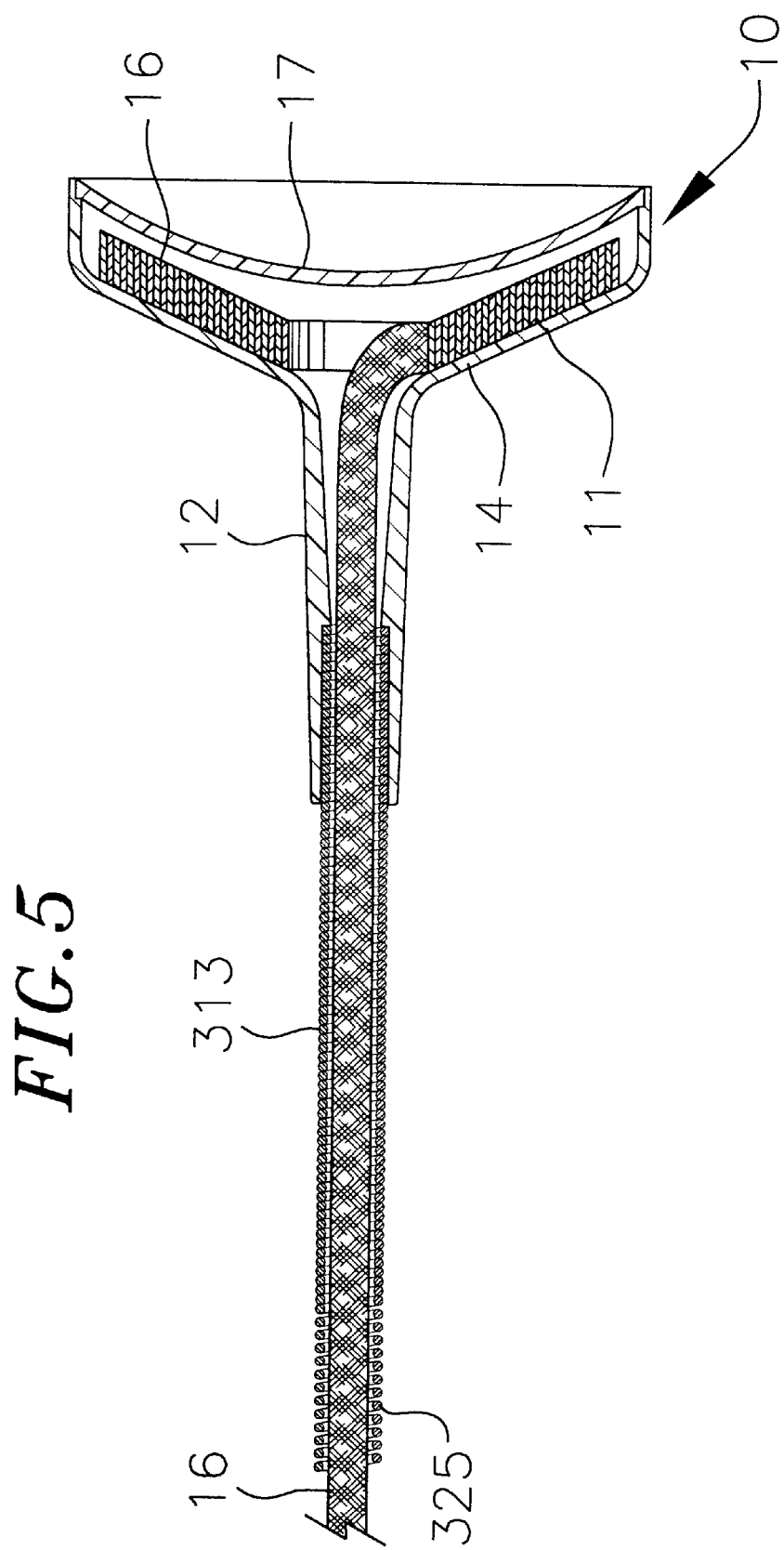
FIG. 5 illustrates in longitudinal cross-section another embodiment of desoldering wick dispenser.

The embodiment of desoldering wick dispenser illustrated in FIG. 5 is the same as that illustrated in FIG. 1, except for the tube 313 through which the wick is dispensed. In this embodiment the tube is fabricated from stainless steel wire helically wound into a coil spring about 5 to 6 cm long. Preferably, the coils of the spring are essentially tight against each other for the major portion of the length of the tube. Near the end remote from the housing, i.e., the end from which the wick is dispensed, it is preferred to space the some of the coils 325 a short distance apart (about 0.05 to 0.5 millimeter) for minimizing heat transfer along the length of the spring.

In an exemplary embodiment the spring is wound with one half millimeter diameter stainless steel wire. An exemplary tube has an inside diameter of about 2.6 to 2.7 mm. A desoldering wick having a nominal width of 3.5 mm can be fitted through such a tube. The wick is generally flat and is buckled somewhat to a width that will fit through a tube having an inside diameter smaller than the nominal width of the flat wick. Smaller widths of wick, of course, fit through the tube easily. The total length of tube beyond the wick housing is about 5 cm. A few turns near the outer end are tight against each other, and approximately the next nine mm of coils are spaced apart about 0.1 mm.

Preferably, the spring forming such a tube is wound with a left hand turn. The spring is screwed into the housing, much as a screw is threaded into a hole, to the depth of an internal shoulder. It is found that a small burr left from snipping off the wire when making the spring digs into a plastic housing and inhibits inadvertent unscrewing of the spring from the housing. More significantly, the left hand winding of the spring inhibits removal. Due to years of exposure to right hand threads, people attempt to remove the spring by turning in the direction of a right hand thread, which, of course, doesn't work. Although a spring tube may be removed by unscrewing as a left hand thread, people rarely think of that.

An advantage of a desoldering wick dispenser with a spring for a dispensing tube is the ability to elastically bend the tube to fit into tight places. When bending force is released, the spring straightens. If desired, such an embodiment may be made with a more ductile material than stainless steel, such as aluminum or plastic, so that a persistent bend may be made for dispensing wick through a bent tube. With a more ductile material for the spring, such a bend may be changed or reversed for use of the dispenser in various situations. Alternatively, one may make a dispenser with a tube that is originally bent or crooked instead of straight.

Stainless steel is exemplary of equivalent metals that have high modulus of elasticity and yield point for making a spring, and which are not wettable by molten solder. Aluminum is exemplary of equivalent metals and plastics that may be plastically deformed to form a bent tube that is not wettable by solder.

Many modifications and variations of a desoldering wick dispenser as described herein will be apparent to those skilled in the art. For example, a somewhat different coil of desoldering wick may be placed in a housing similar to that illustrated in FIG. 3. Such a coil may be a single layer of helical winding of desoldering wick, with the portion of the wick extending through the tube being drawn from an end of the coil nearer to the tube. Such a coil may be made, for example, by winding a single helix of a hollow braid and then compressing the coil longitudinally for flattening the braid.

Sometimes desoldering wick is dispensed from large helically wound spools and pieces are cut off for use. It can be desirable to pass an end of such a piece of wick through a tube for convenient manipulation by an operator. Since other such variations will be apparent, the scope of this invention is limited only by the following claims and their equivalents.

What is claimed is:

1. A desoldering wick dispenser comprising:
 a housing comprising
  a circular body having an end face tapering outwardly nearer the axis of the housing,
  a cover opposite to the tapering end face, and
  a central aperture in the tapering end face;
 a tube connected to the housing and extending away from the aperture; and
 a conically shaped spiral coil of desoldering wick in the housing, an end portion of the wick from an inside part of the spiral extending outside of the housing and through the tube to protrude beyond the end of the tube.

2. A desoldering wick dispenser comprising:
 a housing comprising
  a circular body having an end face tapering outwardly nearer the axis of the housing,
  a cover opposite to the tapering end face, and
  a central aperture in the tapering end face;
 an elastically bendable tube connected to the housing and extending away from the aperture; and
 a conically shaped spiral coil of desoldering wick in the housing, an end portion of the wick from an inside part of the spiral extending outside of the housing and through the tube to protrude beyond the end of the tube.

3. A desoldering wick dispenser comprising:
 a conical housing;
 a central aperture in an end of the housing;
 a tube extending away from the aperture;
 means for connecting the tube to the housing at the aperture; and
 a conical coil of desoldering wick conforming to the conical housing and having an end portion of the wick extending through the tube, wherein the end of the wick extending through the tube is drawn from nearer the center of the coil.

4. A desoldering wick dispenser according to claim 3 wherein the included half angle of the cone is in the range of from 45° to 75°.

5. A desoldering wick dispenser according to claim 3 wherein the housing comprises an outwardly protruding conical end face with the aperture in the center of the conical end face.

6. A desoldering wick dispenser according to claim 3 further comprising a cover on the housing opposite the tube and having a conical shape conforming approximately to the shape of the spiral coil of wick.

7. A desoldering wick dispenser comprising:
 a conical housing;
 a central aperture in an end of the housing;
 an elastically bendable tube extending away from the aperture;
 means for connecting the tube to the housing at the aperture; and
 a conical coil of desoldering wick conforming to the conical housing and having an end portion of the wick extending through the tube, wherein the end of the wick extending through the tube is drawn from nearer the center of the coil.

8. A desoldering wick dispenser comprising:
 a circular housing having an end face tapering outwardly nearer the axis of the housing;
 a central aperture in the tapering end face;
 a tube extending away from the aperture;
 means for connecting the tube to the housing at the aperture; and
 a conically shaped spiral coil of desoldering wick in the housing and having an end portion of the wick extending through the tube.

9. A desoldering wick dispenser according to claim 8 wherein the end face tapers toward the center at an angle in the range of from 45° to 75° relative to the axis of the housing.

10. A desoldering wick dispenser according to claim 9 further comprising a smoothly rounded surface between the tapering end face and the wall of the aperture.

11. A desoldering wick dispenser according to claim 8 wherein the end of the wick extending through the tube is drawn from adjacent the center of the spiral coil.

12. A desoldering wick dispenser according to claim 8 wherein the tube is made of a metal that is not wettable by molten solder.

13. A desoldering wick dispenser comprising:

a circular housing having an end face tapering outwardly nearer the axis of the housing;

a central aperture in the tapering end face;

a tube extending away from the aperture;

a conically shaped spiral coil of desoldering wick approximately complementary to the tapered end face of the housing and having an end portion of the wick extending through the tube; and a cover on the opposite end face of the housing, the cover conforming approximately to the shape of the spiral coil of wick.

14. A desoldering wick dispenser comprising:

a circular housing having an end face tapering outwardly nearer the axis of the housing;

a central aperture in the tapering end face;

an elastically bendable tube extending away from the aperture;

a conically shaped spiral coil of desoldering wick approximately complementary to the tapered end face of the housing and having an end portion of the wick extending through the tube; and a cover on the opposite end face of the housing, the cover conforming approximately to the shape of the spiral coil of wick.

15. A desoldering wick dispenser comprising:

a funnel shaped housing including a tubular extension from the center of the housing; and a coil of desoldering wick engaging a funnel shaped end of the at housing and having an end portion extending through the tubular extension.

16. A desoldering wick dispenser according to claim 15 wherein the end of the wick extends beyond the end of the tubular extension.

17. A desoldering wick dispenser according to claim 15 wherein the portion of wick extending through the tubular extension is drawn from the center of the coil.

18. A desoldering wick dispenser comprising a funnel shaped housing including a tubular extension from the center of the housing; and a coil of desoldering wick in the housing having a conical shape approximately complementary to the inside of the funnel shaped housing and having an end portion extending through the tubular extension.

19. A desoldering wick dispenser comprising a funnel shaped housing including an elastically bendable tubular extension from the center of the housing; and a coil of desoldering wick engaging a funnel shaped end of the housing and having an end portion extending through the tubular extension.

* * * * *